Figure 1:
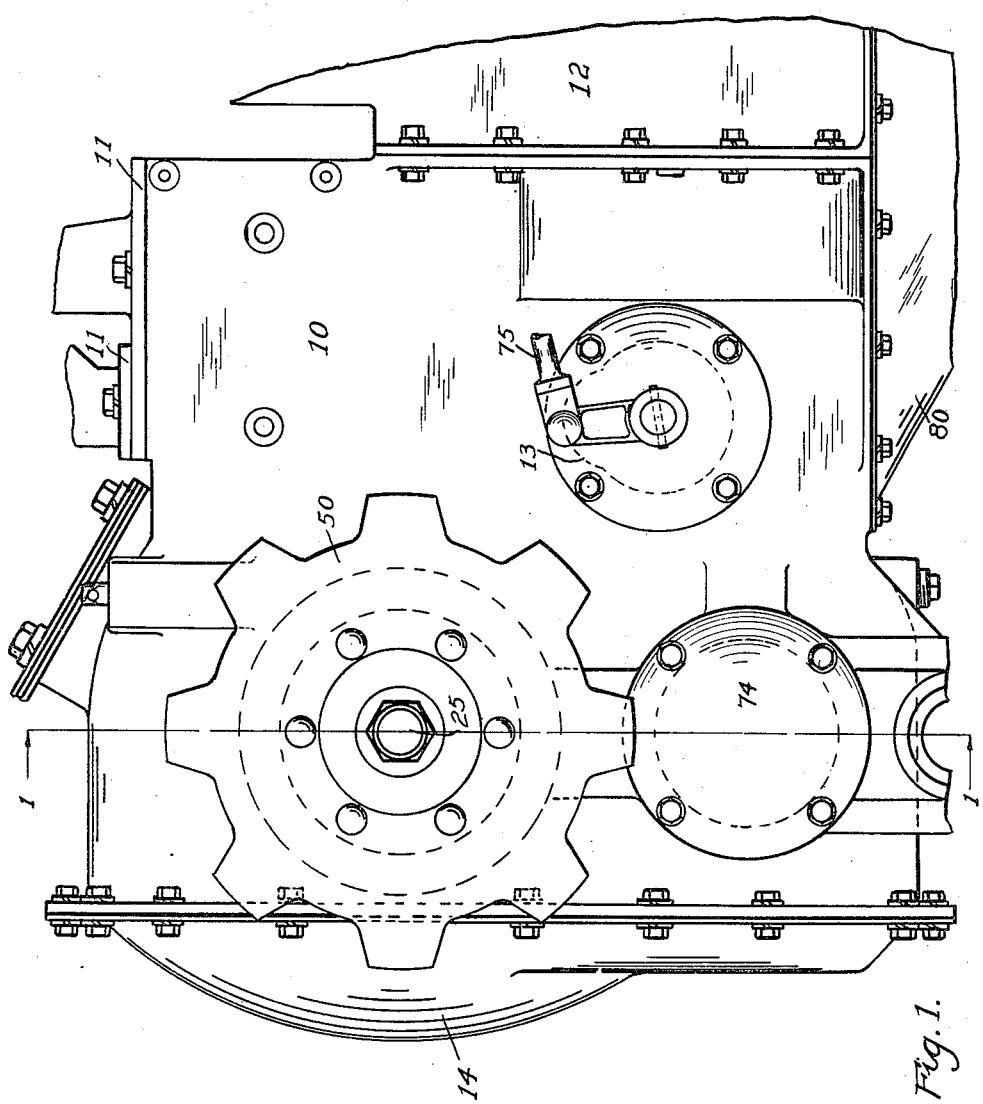

Feb. 26, 1924.

R. H. WHITE 1,485,106

TRANSMISSION GEARING MOUNTING

Filed May 5, 1922    3 Sheets-Sheet 1

INVENTOR
Rollin H. White.
BY
Wayne M. Hart.
ATTORNEY

Feb. 26, 1924.

R. H. WHITE 1,485,106

TRANSMISSION GEARING MOUNTING

Filed May 5, 1922   3 Sheets-Sheet 3

INVENTOR
Rollin H. White.
BY
Wayne M. Hart
ATTORNEY

Patented Feb. 26, 1924.

1,485,106

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRANSMISSION-GEARING MOUNTING.

Application filed May 5, 1922. Serial No. 558,722.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Transmission-Gearing Mountings, of which the following is a full, clear, and exact description.

This invention relates to motor vehicles of the track laying type, which have no main frame except such as is produced by connecting together several castings whose primary purpose is to house and support the engine and transmission mechanism, said built up unit having for its rear member a transmission gear case.

The invention relates more particularly to the mounting, in said transmission gear case, of the two driven axle shafts and certain transmission mechanism units which are intermediate of these axle shafts and the motor shaft. The object is to so mount the stated mechanism units upon and within said transmission gear case that they will be thoroughly protected from dust, and may run in oil, and yet may be easily inspected, and easily and quickly assembled and mounted within said gear case, and may be easily disassembled and withdrawn.

The invention consists in the construction and combination of parts shown in the drawing and hereinafter described in the appended claims.

Figure 2:
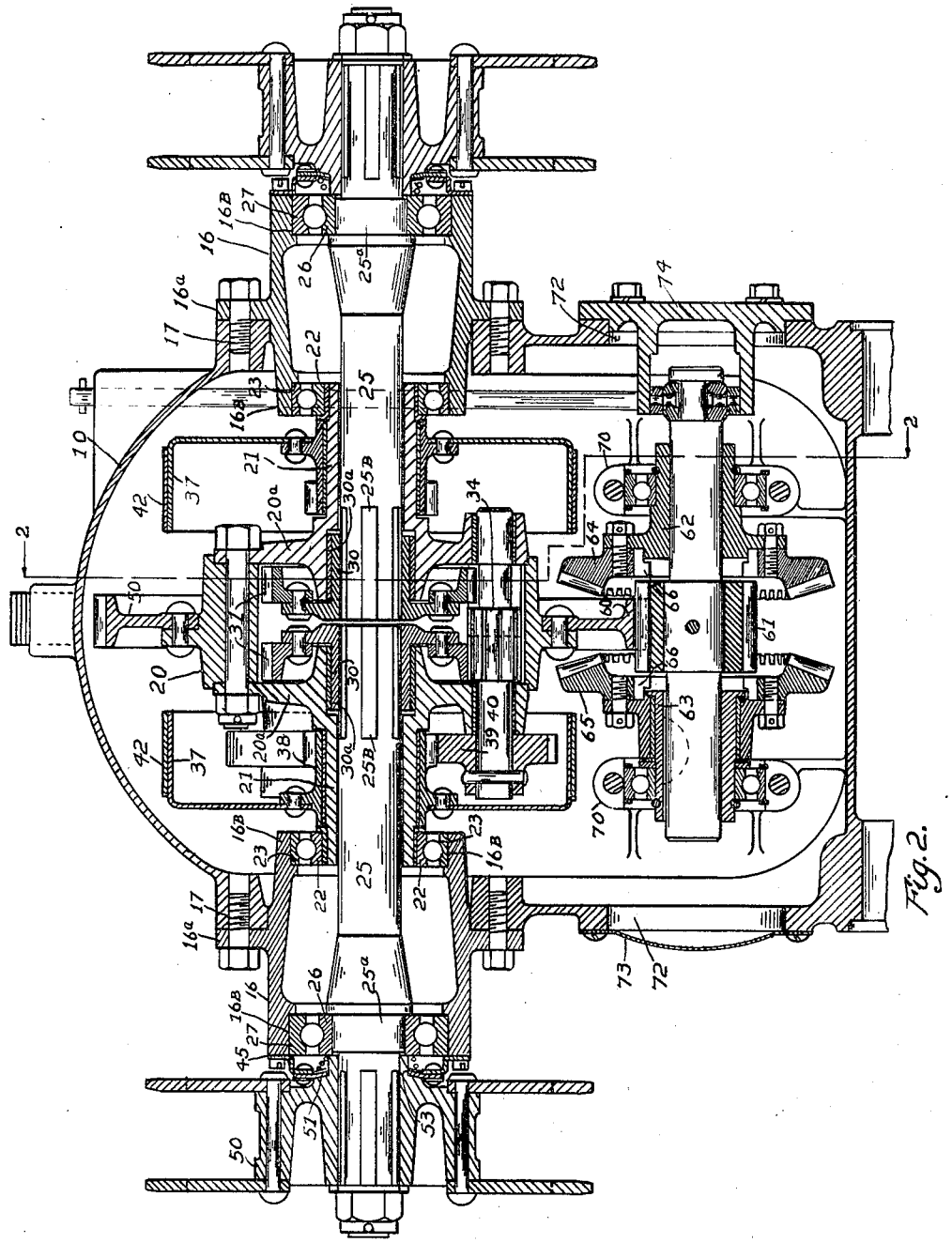
Figure 3:
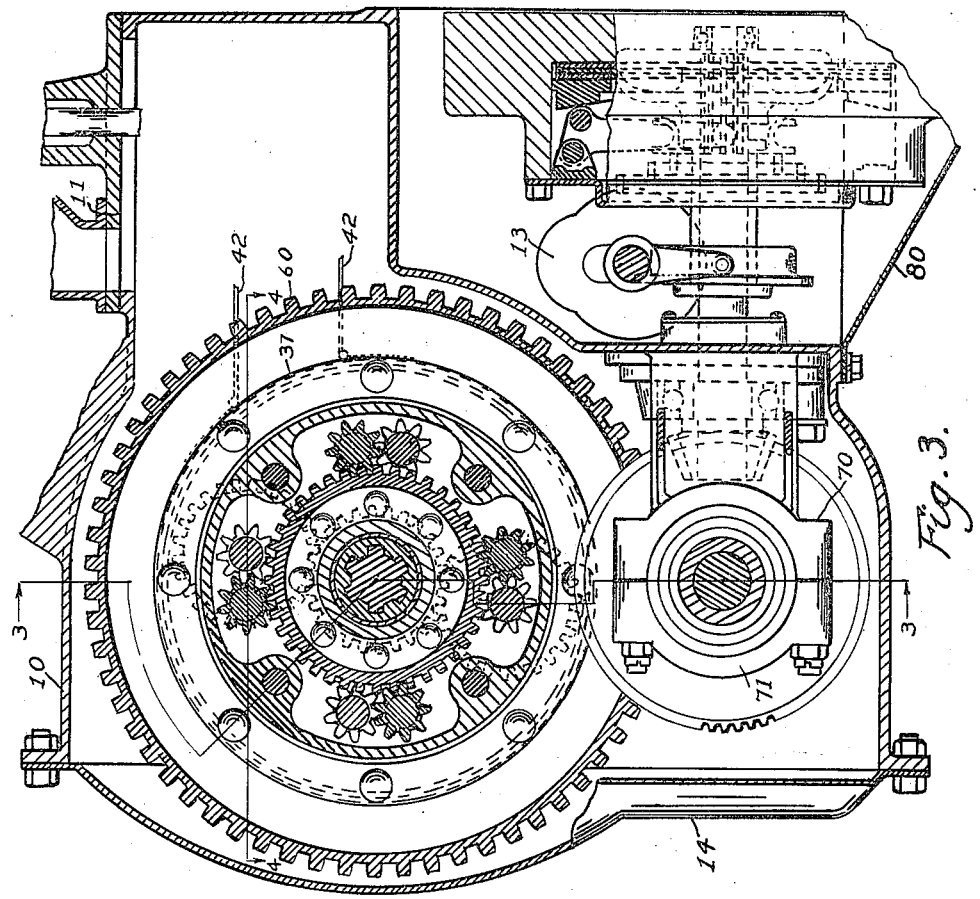
Figure 4:
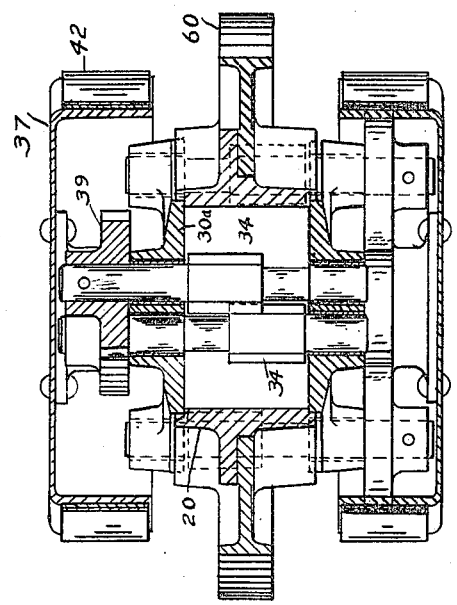

In the drawings, Fig. 1 is a side elevation of the transmission case and the mechanism outside of the same which is supported by the transmission case. Fig. 2 is a sectional rear elevation in the plane of line 2—2 on Fig. 1; Fig. 3 is a sectional side elevation in the plane of line 3—3 on Fig. 2; and Fig. 4 is a sectional plan view in the plane of line 4—4 on Fig. 3.

Referring to the parts by reference characters, 10 represents a gear casing which in the form shown is adapted to be bolted to the rear end of an engine casing 12, and so form a part of the main frame of a tractor. It is provided with a top cover plate 11 which may be removed and replaced at will when it is desired to inspect the enclosed mechanism from the top. It has also aligned openings through its side which are covered and closed by plates 13 which can be removed when it is desired to inspect the enclosed mechanism adjacent said opening. It has also a removable rear cover plate 14 which closes a large opening through the rear end of said opening, being large enough to permit the introduction and removal of certain gear units, to wit, the differential gearing, and the direction changing transmission gearing. The case also has openings through its sides in which the sleeves 16 are fitted, said sleeves being provided with flanges 16ª which may be fastened to the sides of the casing by cap screws 17.

A metal ring 20 forms the drum of a well known type of spur gear differential, and bolted to each side of this drum are end plates 20ª having aligned hubs 21 extending centrally therefrom. These hubs near the ends thereof are rotatably mounted on ball bearings in the inwardly projecting ends of the sleeves 16. The inner ring 22 of each annular ball bearing is fitted upon each hub adjacent their ends, while the outer bearing ring 23 is removably fitted in an annular pocket 16ᵇ in the inner end of each sleeve 16.

25 represents the two aligned axle shafts. Each passes through the associated hub 21 and out of the outer end of the associated sleeve 16, said axle shaft, near its outer end, being rotatably mounted on ball bearings in said sleeve. The inner bearing ring 26 is fitted upon the axle shaft with its inner edge in contact with an annular flange 25ª on the axle shaft. The outer bearing ring 27 is removably fitted within an annular pocket in the outer end of the sleeve in contact with an inwardly projecting flange 16ᵇ. The inner end of each axle shaft is longitudinally splined as at 25ᵇ and the splined inner end of each axle shaft is fitted into the correspondingly splined hub 30, which has bolted thereto a spur gear 31, said hubs and gears being rotatably mounted within the space formed by the drum 20 and the associated end plates 20ª which are secured thereto. The inner ends of the hubs 21 are provided with an annular recess to receive the hubs 30 and a bearing 30ª is positioned between said hubs within the annular recess. There are two sets of compensating spur pinions 34 secured on shafts 40 which project through aligned openings in the end plates 20ª and are secured therein. The pinion 34 of one set engage one of the spur gears 31, while those of the other set engage the other spur gear 31. The spur pinions 34 of one set also mesh with the spur pinions of the other set.

Rotatably mounted upon each of the hubs secured to the sides of the drum is the hub 36 of a brake drum 37, the hub carrying a pinion 38 which is in mesh with the gear 39 fixed to the extended outer end of a shaft 40,—which shaft is rotatably mounted in aligned openings in the end walls of the differential drum, and therefore has operative engagement with one of the compensating pinions 34. These brake drums and their connections with the differential gearing, together with brakes 42 on said brake drums, afford means, which are well understood, for producing any desired definite degree of differentiation in the rate of rotation of the two axle shafts 25.

An annular plate 45 is fixed to the outer end of each of the sleeves 16 and projects inwardly far enough to engage the outer bearing ring 27 and keep it in place. A driving wheel 50 is splined or otherwise fixed upon each of the driving axles, and it is formed near the axle with an annular bearing face 51 for engagement by an annular leather disk 53 which is fixed by a dust proof joint to the plate 45. A coil spring which surrounds the hub of the wheel 50 thrusts endwise against the inner annular bearing ring 26 and said leather disk 53 and holds it against said bearing surface 51 before referred to. This makes a dust proof joint around the hub of the wheel 50 and thereby prevents dust from entering the casing around the axle shaft. By disconnecting plate 45 from the sleeve 16 the associated axle shaft may be moved endwise outwardly and withdrawn from the gear casing, the associated annular ball bearings coming with it; but the differential drum will remain supported by the sleeves 16. To remove the differential mechanism one takes off the rear cover plate, and disconnects and draws outward the two sleeves 16, which in their outward movement leave the annular ball bearings secured upon the hubs extending from the differential drum. The differential gearing being no longer supported it may be removed as a unit rearward out of the opening uncovered by the removal of the rear outer cover plate.

The differential drum has secured to it a large spur driving gear 60 which meshes with a pinion 61 which is a part of the direction changing transmission mechanism unit. The shaft 60$^A$ carrying this pinion is rotatably mounted at one end in a sleeve 62 which is rotatably mounted by means of ball bearings in a bearing bracket 70, the specific construction of which will be presently referred to. The shaft at its opposite end is fitted into and has a tongue and groove connection with a sleeve 63 which is likewise mounted in a bearing bracket 70 upon annular ball bearings. A bevel gear 64 is fixed to the sleeve 62; and another bevel gear 65 is rotatably mounted upon sleeve 63. Each of the bevel gears 64 and 65 is formed with an internal gear 66 adapted to be engaged by the pinion 61 when the shaft 60$^A$ is moved endwise. This particular direction changing transmission gearing unit is more fully described and forms the subject matter of my Patent No. 1456349 issued May 22nd, 1923 and need not be further described here.

The bearing brackets 70 are integral parts of the casing and are located within the same; but they furnish only one half to the support for the ball bearings referred to, the other half being furnished by a removable cap 71 which is so constructed that the line of division between the cap and the stationary part of the bearing is in the vertical plane.

Openings 72 are provided in each side of the transmission casting 10 for the purpose of machining the bearings, and a cap 73 closes one of the openings. A cap 74 is removably secured over the other opening and is provided with inwardly projecting portions which are adapted to receive mechanism for operating the change direction shaft 60$^A$. This mechanism is operated by the driver through lever 75. When it is desired to remove the direction changing unit from the casting, the cap 74 is removed, the rear cover plate 14 is removed and the caps 71 are removed, and then the unit may be moved rearwardly out through the rear end of the transmission gear casing. The assembling of the parts is of course effected by reversing the movements which have been described for removing the parts from the casing.

The usual form of clutch 76 and clutch operating mechanism 77 cooperate with the engine shaft (not shown) and the driving shaft 78 carrying gear 79. The gear 79 meshes with the gears 64 and 65 of the direction changing mechanism which in turn drive shaft 60$^A$ and pinion 61 which meshes with the gear 60 secured on the differential drum.

An oil pan 80 is secured to the transmission casing and extends forwardly under and is secured to the engine casting.

Various changes of details may be resorted to within the scope of the appended claims and I do not limit myself to the specific design and construction herein shown.

Having described my invention, I claim:—

1. The combination of a gear casing having aligned holes in its opposite sides, bearing sleeves which respectively project through said holes into the casing and are removably secured to the casing to close said holes, differential gearing within the casing including a differential drum having oppositely extended aligned tubular hubs which are respectively mounted in inner ends of said sleeves, two driving axles which respectively project through said sleeves and differential drum hubs and are rotatably mounted in bearings located in the outer ends of said sleeves, an annular disk which loosely embraces the projecting end of each axle shaft and is secured to the end of the sleeve in which said axle shaft and its bearings are supported, a wheel secured to the end of said axle shaft and having an annular bearing surface adjacent its hub, and an annular disk of flexible material secured dust tight to said plate in rubbing contact with said surface, and a spring acting to force said flexible disk against said surface.

2. The combination of a gear casing having aligned holes in its opposite sides, bearing sleeves which respectively project through said holes into the casing and are removably secured to the casing closing said holes, differential gearing within the casing including a differential drum having oppositely extended aligned tubular hubs which are respectively mounted in the inner ends of said sleeves upon annular ball bearings the inner ring of which is fixed to the drum hub and the outer ring of which is mounted in an annular pocket in the end of said sleeve, two driving axles which respectively project through said sleeves and differential drum hubs and are rotatably mounted in bearings located in the outer ends of said sleeves said bearings comprising an annular ball bearing of which the inner ring tightly embraces the axle shaft and the outer ring is loosely fitted in an annular pocket in the end of said sleeve, a wheel secured to the outer end of each axle shaft, a plate fixed to the adjacent outer end of each sleeve and overlapping and engaging the adjacent outer ball bearing ring, a flexible annular disk secured dust tight to said plate, there being on said wheel an annular bearing surface with which said flexible disk engages, and a coil spring surrounding the axle shaft and thrusting at its ends against the adjacent inner ring of the ball bearing and against said flexible annular disk.

3. The combination of a gear casing having aligned holes through its sides, which sleeves respectively pass through holes and fill the same and are secured to said casing, a differential drum within said casing having oppositely extended aligned tubular hubs and associated with each at the end thereof an annular ball bearing, the inner ring of which is fixed to the drum hub and the outer ring thereof is removably fitted within an annular pocket in the adjacent sleeve, two axle shafts each associated with one of said sleeves, which axle shaft passes through the sleeve and through the adjacent drum hub, an annular ball bearing whose inner ring is fitted upon said axle shaft and whose outer ring is removably fitted within an annular pocket in the outer end of said sleeve, gears rotatably mounted within the differential drum which gears respectively embrace the two axle shafts and have a supporting and driving connection therewith.

4. The combination of a differential gear case having a large opening through its rear end, a cap for closing said opening, and bearings rigidly fixed within said casing having a removable cap portion, with a direction changing gear unit mounted in the bearings in said casing, said unit being removable bodily through the opening in said casing.

In testimony whereof, I hereunto affix my signature.

ROLLIN H WHITE